United States Patent
Moon et al.

(10) Patent No.: US 9,520,771 B2
(45) Date of Patent: Dec. 13, 2016

(54) POWER SUPPLY AND APPARATUS AND METHOD FOR CONTROLLING LINK VOLTAGE CONTROL SWITCH

(75) Inventors: Sang Cheol Moon, Bucheon (KR); Young-Bae Park, Anyang (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 1232 days.

(21) Appl. No.: 13/239,762

(22) Filed: Sep. 22, 2011

(65) Prior Publication Data

US 2012/0201055 A1 Aug. 9, 2012

(30) Foreign Application Priority Data

Feb. 8, 2011 (KR) .................. 10-2011-0011122

(51) Int. Cl.
*H02M 3/335* (2006.01)
*H02M 1/42* (2007.01)
*H02M 1/00* (2006.01)

(52) U.S. Cl.
CPC ........... *H02M 1/4258* (2013.01); *H02M 3/335* (2013.01); *H02M 2001/0035* (2013.01); *Y02B 70/126* (2013.01); *Y02B 70/16* (2013.01)

(58) Field of Classification Search
CPC ............ H02M 3/33569; H02M 7/5395; H02M 3/33507; H02M 1/4258; H02M 1/32; H02M 2001/0035; H02M 3/335; H02M 2001/332; Y02B 70/126; Y02B 70/16; H02J 3/36
USPC ............. 323/20, 21.1–12, 21.18, 35, 41, 78, 84,323/89, 95, 97, 80
See application file for complete search history.

(56) References Cited

U.S. PATENT DOCUMENTS

| | | | |
|---|---|---|---|
| 4,797,599 A | 1/1989 | Ference et al. | |
| 4,879,625 A | 11/1989 | Potenzone | |
| 5,065,104 A | 11/1991 | Kusko et al. | |
| 5,157,574 A | 10/1992 | Tuusa | |
| 5,559,395 A | 9/1996 | Venkitasubrahmanian et al. | |
| 5,615,097 A | 3/1997 | Cross | |
| 5,666,042 A | 9/1997 | Lewis | |
| 6,172,466 B1 | 1/2001 | Ki et al. | |
| 6,469,917 B1 * | 10/2002 | Ben-Yaakov | 363/44 |
| 8,503,144 B2 * | 8/2013 | Tsai | H02H 7/1213 361/90 |
| 2003/0035311 A1 | 2/2003 | Phadke | |
| 2003/0202305 A1 | 10/2003 | Engel et al. | |
| 2009/0251929 A1 * | 10/2009 | Choi | 363/21.02 |
| 2010/0014331 A1 * | 1/2010 | Moon et al. | 363/89 |
| 2010/0027299 A1 * | 2/2010 | Fang | 363/21.15 |

(Continued)

FOREIGN PATENT DOCUMENTS

| | | |
|---|---|---|
| CN | 1309459 A | 8/2001 |
| CN | 1338868 A | 3/2002 |

(Continued)

*Primary Examiner* — Gustavo Rosario Benitez
(74) *Attorney, Agent, or Firm* — Okamoto & Benedicto LLP

(57) ABSTRACT

A power supply includes a rectifier for rectifying an AC line voltage to generate a link voltage, a link capacitor for charging the link voltage, a control switch for controlling charge of the link capacitor, a converter for converting the link voltage to a DC voltage, and a switch controller. When the converter operates in a standby operation mode, the switch controller controls on-off of the control switch through a pulse signal having an on-time determined based on a peak value of a detected AC line voltage.

20 Claims, 3 Drawing Sheets

(56) References Cited

U.S. PATENT DOCUMENTS

| | | |
|---|---|---|
| 2010/0225251 A1 | 9/2010 | Maruyama |
| 2010/0226153 A1 | 9/2010 | Kaulio |
| 2010/0309694 A1* | 12/2010 | Huang .................. H02M 1/126 363/49 |
| 2011/0210712 A1* | 9/2011 | Tagare .......................... 323/284 |
| 2011/0215780 A1* | 9/2011 | Lee et al. ...................... 323/282 |
| 2011/0305051 A1* | 12/2011 | Yang et al. .................... 363/49 |

FOREIGN PATENT DOCUMENTS

| | | |
|---|---|---|
| CN | 1404207 A | 3/2003 |
| CN | 101262170 A | 9/2008 |
| CN | 101399492 A | 4/2009 |
| CN | 101714831 A | 5/2010 |

* cited by examiner

POWER SUPPLY AND APPARATUS AND METHOD FOR CONTROLLING LINK VOLTAGE CONTROL SWITCH

CROSS-REFERENCE TO RELATED APPLICATION

This application claims priority to and the benefit of Korean Patent Application No. 10-2011-0011122 filed in the Korean Intellectual Property Office on Feb. 8, 2011, the entire contents of which are incorporated herein by reference.

BACKGROUND OF THE INVENTION (a) Field of the Invention

The present invention relates to a power supply.

(b) Description of the Related Art

The switch mode power supply (SMPS) rectifies an input AC voltage to generate a DC link voltage, and converts the DC link voltage into a different level of a DC output voltage. The DC output voltage may be higher or lower than the DC link voltage. This SMPS is mainly used in electronic devices, particularly battery power supplies such as for mobile phones and laptop computers. The SMPS has a normal operation mode where it consumes a relatively large amount of power, and a standby operation mode where it consumes a relatively small amount of power.

For improving the efficiency of the SMPS in a standby operation mode, burst mode switching is used while the switching frequency is limited to a constant value. The burst mode switching means that the SMPS repeats one operation for outputting power through a switching operation during a certain time and another operation for stopping the switching operation during a certain time.

However, the switching power loss is proportional to the switching frequency and a square of a voltage in a switching transistor. Therefore, there is a limit in reducing power loss only by controlling the switching frequency in a standby operation mode.

SUMMARY OF THE INVENTION

Embodiments of the present invention provide a power supply for reducing power loss by reducing the magnitude of a voltage in a switching transistor in the standby operation mode.

An embodiment of the present invention provides an apparatus for controlling a control switch for controlling a link voltage of a power supply including a rectifier for rectifying an AC line voltage to generate the link voltage and a converter for converting the link voltage to a DC voltage, including a line voltage detector for detecting the AC line voltage; and an on-time generator for generating a control signal for controlling the control switch through a pulse signal when the converter operates at a standby operation mode, the pulse signal having an on-time determined based on a peak value of a detected AC line voltage from the line voltage detector.

The larger the peak value is, the smaller the on-time may be.

The on-time may be inversely proportional to the peak value.

The on-time generator may include a first comparator for comparing the detected AC line voltage with a first reference signal to generate a first comparison signal; a peak detector for detecting the peak value of the detected AC line voltage; and a pulse generator for determining the on-time based on the peak value detected by the peak detector and generating the pulse signal by using a determined on-time and the first comparison signal.

The pulse generator may include a delay capacitor; a first current source for outputting a constant current; a first switch providing the constant current to the delay capacitor according to the first comparison signal; a second current source for outputting a dependent current, wherein the dependent current is dependent on the detected peak value; a second switch for sinking the dependent current from the delay capacitor according to the first comparison signal; a second comparator for comparing a voltage of the delay capacitor with a second reference voltage to generate a second comparison signal; and an AND gate for performing an AND operation with the second comparison signal and the first comparison signal as inputs.

The dependent current may be proportional to the detected peak value.

If a level of the first comparison signal is low, the first switch may be turned on so that the delay capacitor is charged through the constant current.

If the level of the first comparison signal is high, the second switch may be turned on so that the delay capacitor is discharged through the dependent current.

The constant current may be larger than the dependent current.

The on-time generator may include a mode instruction signal generator for generating a mode instruction signal; an OR gate for performing an OR operation with the pulse signal and the mode instruction signal to generate a gate signal; and a gate driver for converting the gate signal into the control signal.

The mode instruction signal generator may include a hysteresis comparator for comparing a feedback signal having information corresponding to the DC voltage with a mode reference voltage to generate the mode instruction signal.

Another embodiment of the present invention provides a method for controlling a control switch for controlling a link voltage of a power supply including a rectifier for rectifying an AC line voltage to generate the link voltage and a converter for converting the link voltage to a DC voltage, including detecting the AC line voltage; determining an on-time based on a peak value of a detected AC line voltage; and generating a control signal for controlling the control switch through a pulse signal with the on-time when the converter operates in a standby operation mode.

Generating the control signal may include comparing the detected AC line voltage with a first reference signal to generate a first comparison signal; and generating the pulse signal by using the on-time and the first comparison signal.

Generating the control signal further may include generating a mode instruction signal; performing an OR operation with the pulse signal and the mode instruction signal as inputs to generate a gate signal; and converting the gate signal into the control signal.

Generating the pulse signal may include providing a constant current to a delay capacitor in a first level of the first comparison signal; sinking a dependent current from the delay capacitor in a second level of the first comparison signal wherein the dependent current is proportional to the peak value; comparing a voltage of the delay capacitor with a second reference voltage to generate a second comparison signal; and performing an AND operation with the second comparison signal and the first comparison signal as inputs to generate the pulse signal.

Yet another embodiment of the present invention provides a power supply, including a rectifier for rectifying an AC line voltage to generate a link voltage; a link capacitor for charging the link voltage; a control switch for controlling charge of the link capacitor; a converter for converting the link voltage to a DC voltage; and a switch controller for controlling on-off of the control switch through a pulse signal when the converter operates in a standby operation mode, the pulse signal having an on-time determined based on a peak value of a detected AC line voltage.

The switch controller may include a line voltage detector for detecting the AC line voltage; a first comparator for comparing the detected AC line voltage with a first reference signal to generate a first comparison signal; a peak detector for detecting the peak value of the detected AC line voltage; a pulse generator for determining the on-time based on the peak value detected by the peak detector and generating the pulse signal by using a determined on-time and the first comparison signal; a mode instruction signal generator for generating a mode instruction signal; an OR gate for performing an OR operation with the pulse signal and the mode instruction signal to generate a gate signal; and a gate driver for converting the gate signal into the control signal.

The pulse generator may include a delay capacitor; a first current source for outputting a constant current; a first switch providing the constant current to the delay capacitor according to the first comparison signal; a second current source for outputting a dependent current, wherein the dependent current is dependent on the detected peak value; a second switch for sinking the dependent current from the delay capacitor according to the first comparison signal; a second comparator for comparing a voltage of the delay capacitor with a second reference voltage to generate a second comparison signal; and an AND gate for performing an AND operation with the second comparison signal and the first comparison signal as inputs.

The mode instruction signal generator may include a hysteresis comparator for comparing a feedback signal having information corresponding to the DC voltage with a mode reference voltage to generate the mode instruction signal.

DETAILED DESCRIPTION OF THE EMBODIMENTS

Figure 1:
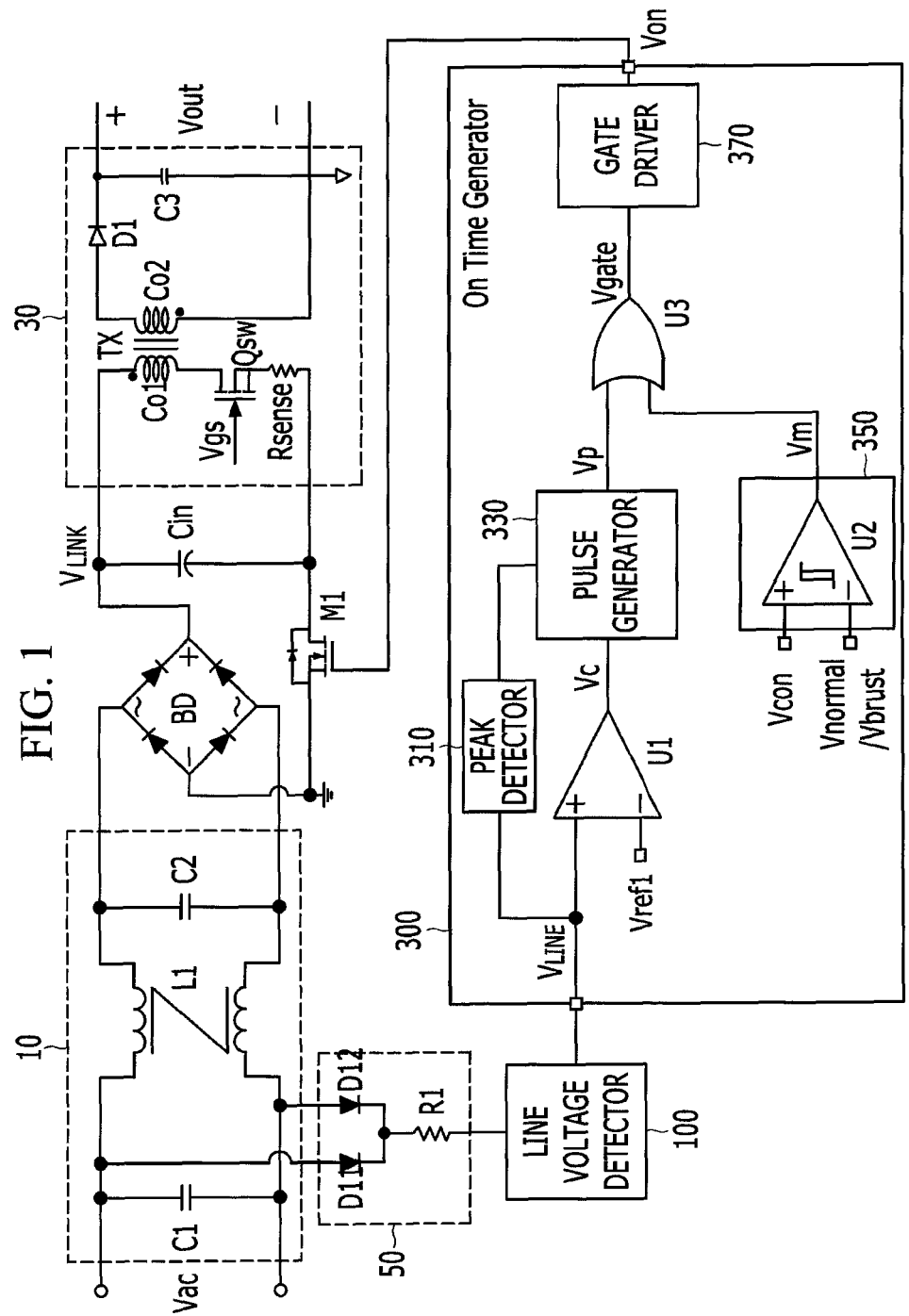
FIG. 1 is a schematic diagram showing a circuit of a power supply according to an embodiment of the present invention.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "connected" to another element, the element may be "directly connected" to the other element or "electrically connected" to the other element through a third element.

In addition, unless explicitly described to the contrary, the word "comprise" and variations such as "comprises" or "comprising" will be understood to imply the inclusion of stated elements but not the exclusion of any other elements.

Hereinafter, referring to drawings, a power supply according to an embodiment of the present invention will be described.

FIG. 1 is a schematic diagram showing a circuit of a power supply according to an embodiment of the present invention.

As shown in FIG. 1, the power supply according to an embodiment of the present invention of which input is an AC line voltage Vac and of which output is a DC voltage Vout includes an electromagnetic interference (EMI) filter 10, a bridge diode BD, a link capacitor Cin, a link voltage control transistor M1, a DC-DC converter 30, a line voltage rectifier 50, a line voltage detector 100, and an on-time generator 300.

The EMI filter 10 reduces the EMI of the AC line voltage Vac. The EMI filter 10 according to an embodiment of the present invention includes a capacitor C1, a choke coil L1, and a capacitor C2. Two terminals of the capacitor C1 are provided with the AC line voltage Vac. Two input terminals of the choke coil L1 are connected to the two terminals of the capacitor C1, respectively. Two output terminals of the choke coil L1 are connected to the two terminals of the capacitor C2, respectively.

The bridge diode BD rectifies an EMI-reduced AC line voltage. Two input terminals of the bridge diode BD are connected to the two terminals of the capacitor C2, respectively. One of two output terminals of the bridge diode BD is connected to one terminal of the link capacitor Cin, and the other of two output terminals of the bridge diode BD is connected to a source electrode of the link voltage control transistor M1.

The link capacitor Cin performs low-pass filtering of the EMI-reduced AC line voltage to generate a link voltage $V_{LINK}$. The one terminal of the link capacitor Cin is connected to one of two terminals of the bridge diode BD, and the other terminal of the link capacitor Cin is connected to a drain electrode of the link voltage control transistor M1.

The link voltage control transistor M1 can consist of a metal oxide semiconductor field-effect transistor (MOSFET). The link capacitor Cin is charged during on-time of the link voltage control transistor M1, and the link capacitor Cin is not charged during off-time of the link voltage control transistor M1.

The DC-DC converter 30 with the link voltage $V_{LINK}$ as an input outputs the DC voltage Vout. The DC-DC converter 30 according to an embodiment of the present invention includes a transformer TX, a power switch Qsw, a sensing resister Rsense, a diode D1, and a capacitor C3. One terminal of a primary coil Co1 of the transformer TX is connected to the one terminal of the link capacitor Cin, and the other terminal of the primary coil Co1 is connected to the drain electrode of the power switch Qsw. One terminal of a secondary coil Co2 of the transformer TX is connected to an anode of the diode D1, and the other terminal of the secondary coil Co2 is connected to one terminal of the capacitor C3. A drain electrode of the power switch Qsw is connected to the one terminal of the primary coil Co1 of the transformer TX, a source electrode of the power switch Qsw is connected to one terminal of the sensing resister Rsense, and a gate electrode of the power switch Qsw is provided with a switching control signal Vgs. The one terminal of the sensing resister Rsense is connected to the source electrode of the power switch Qsw, and the other terminal of the sensing resister Rsense is connected to the one terminal of the link capacitor Cin. A detection voltage occurring from the sensing resister Rsense can be used for generating the switching control signal Vgs. The anode of the diode D1 is connected to the one terminal of the secondary coil Co2 of the transformer TX, and a cathode of the diode D1 is connected to the one terminal of the capacitor C3. The one terminal of the capacitor C3 is connected to the cathode of the diode D1, and the other terminal of the capacitor C3 is connected to the other terminal of the secondary coil Co2 of the transformer TX.

The line voltage rectifier 50 rectifies the AC line voltage Vac. The line voltage rectifier 50 according to an embodiment of the present invention includes a diode D11, a diode D12, and a resister R1. An anode of the diode D11 is connected to one terminal of the AC line voltage Vac, and an anode of the diode D12 is connected to the other terminal of the AC line voltage Vac. A cathode of the diode D11 is connected to a cathode of the diode D12. One terminal of the resister R1 is connected to the cathode of the diode D11, and the other terminal of the resister R1 outputs a rectified AC line voltage.

The line voltage detector 100 detects the rectified AC line voltage to output an AC line detection voltage $V_{LINE}$.

The on-time generator 300 outputs a link voltage control signal Von based on the AC line detection voltage $V_{LINE}$. The on-time generator 300 according to an embodiment of the present invention includes a comparator U1, a peak detector 310, a pulse generator 330, a mode instruction signal generator 350, an OR gate U3, and a gate driver 370.

The comparator U1 compares the AC line detection voltage $V_{LINE}$ with a reference voltage Vref1 to generate a comparison signal Vc. The comparator U1 according to an embodiment of the present invention can consist of an operational amplifier (OP AMP). A non-inverted terminal of the comparator U1 is provided with the AC line detection voltage $V_{LINE}$, and an inverted terminal of the comparator U1 is provided with the reference voltage Vref1.

The peak detector 310 detects and outputs a peak voltage of the AC line detection voltage $V_{LINE}$.

The pulse generator 330 generates a pulse signal Vp by using the comparison signal Vc corresponding to an output signal of the comparator U1 and the peak voltage corresponding to an output of the peak detector 310. The pulse generator 330 will be described below.

The mode instruction signal generator 350 outputs a mode instruction signal Vm according to an operation mode of the DC-DC converter 30. If the operation mode of the DC-DC converter 30 corresponds to a normal operation mode, the mode instruction signal generator 350 according to an embodiment of the present invention outputs the mode instruction signal Vm with a high level. If the operation mode of the DC-DC converter 30 corresponds to a standby operation mode, the mode instruction signal generator 350 according to an embodiment of the present invention outputs the mode instruction signal Vm with a low level.

The mode instruction signal generator 350 according to an embodiment of the present invention includes a hysteresis comparator U2. A non-inverted terminal of the hysteresis comparator U2 is provided with a feedback signal Vcon, and an inverted terminal of the hysteresis comparator U2 is provided with a mode reference voltage Vnormal/Vburst.

The feedback signal Vcon is a signal having information corresponding to the output DC voltage Vout. The feedback signal Vcon is used for determining turn-off timing of the power switch Qsw. For generating this feedback signal Vcon, a photo-coupled photodiode and a transistor can be used. Since a person of ordinary skill in the art can easily know this, the concrete description will be omitted. The mode reference voltage Vnormal/Vburst corresponds to a reference voltage for determining the operation mode of the DC-DC converter 30. If the DC-DC converter 30 operates at the normal operation mode, the feedback signal Vcon is higher than the mode reference voltage Vnormal/Vburst, so the hysteresis comparator U2 outputs a gate signal Vgate with a high level. On the contrary, if the DC-DC converter 30 operates at the burst operation mode, the feedback signal Vcon is lower than the mode reference voltage Vnormal/Vburst, the hysteresis comparator U2 outputs the gate signal Vgate with a low level.

The OR gate U3 performs an OR operation with the pulse signal Vp and the mode instruction signal Vm as inputs to generate the gate signal Vgate.

The gate driver 370 converts the gate signal Vgate into the link voltage control signal Von that can control the link voltage control transistor M1.

Next, referring to FIG. 2, the pulse generator 330 according to an embodiment of the present invention will be described.

Figure 2:
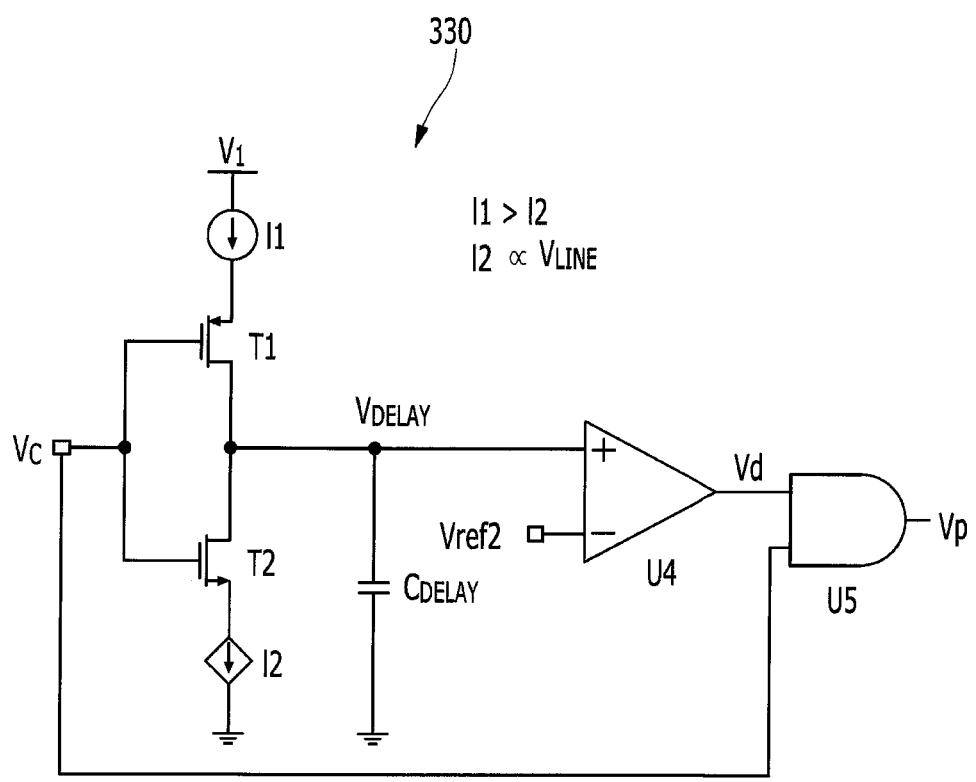
FIG. 2 is a schematic diagram showing a circuit of a pulse generator according to an embodiment of the present invention.

FIG. 2 is a schematic diagram showing a circuit of a pulse generator according to an embodiment of the present invention.

As shown in FIG. 2, the pulse generator 330 according to an embodiment of the present invention includes an independent current source I1, a PMOS transistor (p-channel MOSFET) T1, a voltage-dependent current source I2, an NMOS transistor (n-channel MOSFET) T2, a delay capacitor Cdelay, a comparator U4, and an AND gate U5.

The independent current source I1 provides a constant current. The voltage-dependent current source I2 sinks a current proportional to the peak voltage of the AC line detection voltage $V_{LINE}$ detected by the peak detector 310. The magnitude of the current sunken by the voltage-dependent current source I2 is smaller than the magnitude of the current provided by the independent current source I1.

The PMOS transistor T1 has a source electrode connected to the independent current source I1, a gate electrode connected to the comparison signal Vc, and a drain electrode connected to a drain electrode of the NMOS transistor T2.

The NMOS transistor T2 has a drain electrode connected to the drain electrode of the PMOS transistor T1, a gate electrode connected to the comparison signal Vc, and a source electrode connected to the voltage-dependent current source I2.

The delay capacitor $C_{DELAY}$ has one terminal connected to the drain electrode of the PMOS transistor T1 and the other terminal connected to a ground. A delay voltage $V_{DELAY}$ corresponds to a voltage for charging the delay capacitor $C_{DELAY}$.

The comparator U4 compares the delay voltage $V_{DELAY}$ with a reference voltage Vref2 to generate a comparison voltage Vd. The comparator U4 can consist of an operational amplifier (OP AMP). A non-inverted terminal of the comparator U4 is provided with the delay voltage $V_{DELAY}$, and an inverted terminal of the comparator U4 is provided with the reference voltage Vref2.

The AND gate U5 performs an AND operation with a comparison voltage Vc and the comparison voltage Vd as inputs to generate the pulse signal Vp.

Next, referring to FIG. 3, an operation of the power supply according to an embodiment of the present invention will be described.

Figure 3:
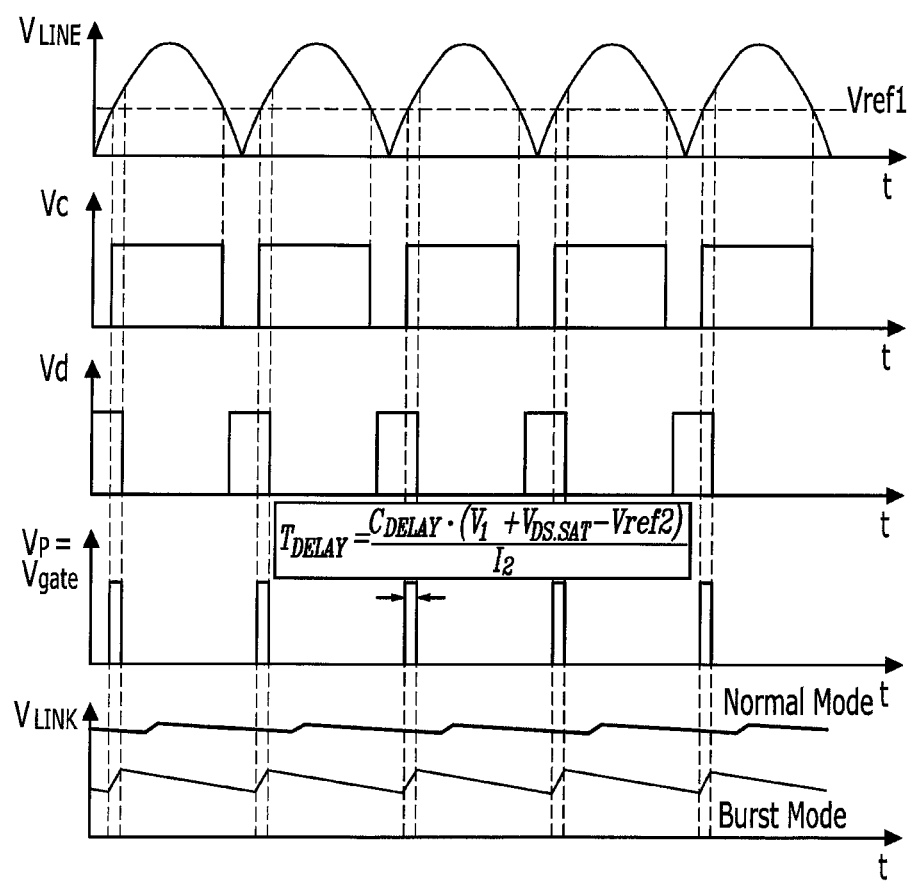
FIG. 3 is a waveform diagram showing an operation of a power supply according to an embodiment of the present invention.

FIG. 3 is a waveform diagram showing an operation of a power supply according to an embodiment of the present invention.

The line voltage detector 100 outputs the AC line detection voltage $V_{LINE}$ with a rectified AC voltage waveform as shown in FIG. 3.

The comparator U1 compares the AC line detection voltage $V_{LINE}$ with the reference voltage Vref1 to output the comparison signal Vc with a waveform as shown in FIG. 3.

In an interval where the AC line detection voltage $V_{LINE}$ is lower than the reference voltage Vref1, the comparator U1 outputs the comparison signal Vc with a low level. At this time, the PMOS transistor T1 is turned on and the NMOS transistor T2 is turned off by the comparison signal Vc with the low level, so the delay capacitor $C_{DELAY}$ is charged by the independent current source I1.

In the other hand, in an interval where the AC line detection voltage $V_{LINE}$ is higher than the reference Voltage Vref1, the comparator U1 outputs the comparison signal Vc with the high level. At this time, the PMOS transistor T1 is turned off and the NMOS transistor T2 is turned on by the comparison signal Vc with the high level, so the delay capacitor $C_{DELAY}$ is discharged by the voltage-dependent current source I2.

If the magnitude of the delay voltage $V_{DELAY}$ is lower than the magnitude of the reference voltage Vref2 due to discharge of the delay capacitor $C_{DELAY}$, the comparator U4 outputs a comparison signal Vd with the low level.

The AND gate U5 performs an AND operation with the comparison voltage Vc and the comparison voltage Vd as inputs, so it generates the pulse signal Vp of which the high-level interval is $T_{DELAY}$.

A rising edge of this pulse signal Vp corresponds to a start time when the delay capacitor $C_{DELAY}$ starts discharging. The high-level interval of the pulse signal Vp corresponds to discharging time of the delay capacitor $C_{DELAY}$. The discharging time of the delay capacitor $C_{DELAY}$ is determined by the amount of charges of the delay capacitor $C_{DELAY}$ and the magnitude of the discharging current.

Therefore, a delay time $T_{DELAY}$ corresponding to the discharging time of the delay capacitor $C_{DELAY}$ can be determined as shown in Equation 1.

$$T_{DELAY} = \frac{C_{DELAY} \cdot (V_1 + V_{DS\text{-}SAT} - Vref2)}{I_2} \quad \text{(Equation 1)}$$

On the other hand, in a case that the operation mode of the DC-DC converter 30 corresponds to the normal operation mode, the mode instruction signal generator 350 outputs the mode instruction signal Vm with the high level. With this, the OR gate U3 always outputs the gate signal Vgate with the high level, and the link voltage control transistor M1 is always turned on. Therefore, the link voltage $V_{LINK}$ has a relatively large value as shown in FIG. 3.

On the contrary, in a case that the operation mode of the DC-DC converter 30 corresponds to the standby operation mode, the mode instruction signal generator 350 outputs the mode instruction signal Vm with the low level, so the OR gate U3 outputs the gate signal Vgate with the same waveform as the pulse signal Vp. That is, the link voltage control transistor M1 is turned on and the link capacitor Cin is charged only in an interval where the pulse signal Vp corresponds to the high level. Also, the link voltage control transistor M1 is turned off and the link capacitor Cin is discharged by a light load in an interval where the pulse signal Vp corresponds to the low level. Therefore, the magnitude of the link voltage $V_{LINK}$ in both terminals of the link capacitor Cin is relatively small.

Next, referring to Table 1, the efficiency of the power supply according to an embodiment of the present invention will be described.

TABLE 1

| DC-DC CONVERTER | | | Pin (W) | | | |
|---|---|---|---|---|---|---|
| Vo(V) | Io(A) | Po(W) | 42 Vac | 115 Vac | 230 Vac | 265 Vac |
| 5 | 0 | 0 | 0.021 | 0.023 | 0.028 | 0.032 |
| 5 | 0.005 | 0.025 | 0.058 | 0.059 | 0.066 | 0.069 |
| 5 | 0.01 | 0.05 | 0.087 | 0.087 | 0.094 | 0.098 |
| 5 | 0.015 | 0.075 | 0.123 | 0.123 | 0.13 | 0.134 |
| 5 | 0.02 | 0.1 | 0.158 | 0.157 | 0.165 | 0.17 |

As seen in Table 1, in a light-load circumstance, the larger the magnitude of the link voltage $V_{LINK}$ is, the worse the efficiency is, because the power consumption of the power supply increases.

However, because it is possible to reduce the magnitude of the link voltage $V_{LINK}$ as 42 Vac according to an embodiment of the present invention, the power supply has good efficiency.

The addition of the link voltage control transistor M1 cause an additional power loss in the normal operation mode. However, the additional power loss can be ignored because the loss is 130 mW in a 30 W-load when a 400V 1 ohm NMOS transistor is used. Also, because it is not necessary to use a large NMOS transistor for the link voltage control transistor M1, the additional cost is not large.

According to aspects of embodiments of the present invention, it is possible to improve the efficiency of the power supply in the standby operation mode through a small additional cost and a small additional power loss in the normal operation mode.

The embodiments of the present invention are not implemented only by a device and/or method, but can be implemented through a program for realizing functions corresponding to the configuration of the embodiments of the present invention and a recording medium having the program recorded thereon. These implementations can be realized by the ordinarily skilled person in the art from the description of the above-described embodiment.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for controlling a control switch for controlling a link voltage of a power supply including a rectifier for rectifying an AC line voltage to generate the link voltage and a converter for converting the link voltage to a DC voltage, comprising:
   a line voltage detector for detecting the AC line voltage; and
   an on-time generator for generating a control signal for controlling the control switch through a pulse signal when the converter operates at a standby operation mode, the pulse signal having an on-time determined based on a peak value of a detected AC line voltage from the line voltage detector.

2. The apparatus of claim 1, wherein the larger the peak value is, the smaller the on-time is.

3. The apparatus of claim 2, wherein the on-time is inversely proportional to the peak value.

4. The apparatus of claim 3, wherein the on-time generator comprises:
a first comparator for comparing the detected AC line voltage with a first reference signal to generate a first comparison signal;
a peak detector for detecting the peak value of the detected AC line voltage; and
a pulse generator for determining the on-time based on the peak value detected by the peak detector and generating the pulse signal by using a determined on-time and the first comparison signal.

5. The apparatus of claim 4, wherein the pulse generator comprises:
a delay capacitor;
a first current source for outputting a constant current;
a first switch providing the constant current to the delay capacitor according to the first comparison signal;
a second current source for outputting a dependent current, wherein the dependent current is dependent on the detected peak value;
a second switch for sinking the dependent current from the delay capacitor according to the first comparison signal;
a second comparator for comparing a voltage of the delay capacitor with a second reference voltage to generate a second comparison signal; and
an AND gate for performing an AND operation with the second comparison signal and the first comparison signal as inputs.

6. The apparatus of claim 5, wherein the dependent current is proportional to the detected peak value.

7. The apparatus of claim 6, wherein, if a level of the first comparison signal is low, the first switch is turned on so that the delay capacitor is charged through the constant current, and
wherein, if the level of the first comparison signal is high, the second switch is turned on so that the delay capacitor is discharged through the dependent current.

8. The apparatus of claim 7, wherein the constant current is larger than the dependent current.

9. The apparatus of claim 3, wherein the on-time generator comprises:
a mode instruction signal generator for generating a mode instruction signal;
an OR gate for performing an OR operation with the pulse signal and the mode instruction signal to generate a gate signal; and
a gate driver for converting the gate signal into the control signal.

10. The apparatus of claim 9, wherein the mode instruction signal generator comprises a hysteresis comparator for comparing a feedback signal having information corresponding to the DC voltage with a mode reference voltage to generate the mode instruction signal.

11. A method for controlling a control switch for controlling a link voltage of a power supply including a rectifier for rectifying an AC line voltage to generate the link voltage and a converter for converting the link voltage to a DC voltage, comprising:
detecting the AC line voltage;
determining an on-time based on a peak value of a detected AC line voltage; and
generating a control signal for controlling the control switch through a pulse signal with the on-time when the converter operates in a standby operation mode.

12. The method of claim 11, wherein the on-time is inversely proportional to the peak value.

13. The method of claim 12, wherein generating the control signal comprises:
comparing the detected AC line voltage with a first reference signal to generate a first comparison signal; and
generating the pulse signal by using the on-time and the first comparison signal.

14. The method of claim 13, wherein generating the control signal further comprises:
generating a mode instruction signal;
performing an OR operation with the pulse signal and the mode instruction signal as inputs to generate a gate signal; and
converting the gate signal into the control signal.

15. The method of claim 14, wherein generating the pulse signal comprises:
providing a constant current to a delay capacitor in a first level of the first comparison signal;
sinking a dependent current from the delay capacitor in a second level of the first comparison signal wherein the dependent current is proportional to the peak value;
comparing a voltage of the delay capacitor with a second reference voltage to generate a second comparison signal; and
performing an AND operation with the second comparison signal and the first comparison signal as inputs to generate the pulse signal.

16. A power supply, comprising:
a rectifier for rectifying an AC line voltage to generate a link voltage;
a link capacitor that is charged by the link voltage;
a control switch for controlling charge of the link capacitor;
a converter for converting the link voltage to a DC voltage; and
a switch controller for controlling on-off of the control switch through a pulse signal when the converter operates in a standby operation mode, the pulse signal having an on-time determined based on a peak value of a detected AC line voltage.

17. The power supply of claim 16, wherein the on-time is inversely proportional to the peak value.

18. The power supply of claim 17, wherein the switch controller comprises:
a line voltage detector for detecting the AC line voltage;
a first comparator for comparing the detected AC line voltage with a first reference signal to generate a first comparison signal;
a peak detector for detecting the peak value of the detected AC line voltage;
a pulse generator for determining the on-time based on the peak value detected by the peak detector and generating the pulse signal by using a determined on-time and the first comparison signal;
a mode instruction signal generator for generating a mode instruction signal;
an OR gate for performing an OR operation with the pulse signal and the mode instruction signal to generate a gate signal; and a gate driver for converting the gate signal into the control signal.

19. The power supply of claim 18, wherein the pulse generator comprises:
a delay capacitor;
a first current source for outputting a constant current;
a first switch providing the constant current to the delay capacitor according to the first comparison signal;
a second current source for outputting a dependent current, wherein the dependent current is dependent on the detected peak value;
a second switch for sinking the dependent current from the delay capacitor according to the first comparison signal;
a second comparator for comparing a voltage of the delay capacitor with a second reference voltage to generate a second comparison signal; and
an AND gate for performing an AND operation with the second comparison signal and the first comparison signal as inputs.

20. The power supply of claim 19, wherein the mode instruction signal generator comprises:
a hysteresis comparator for comparing a feedback signal having information corresponding to the DC voltage with a mode reference voltage to generate the mode instruction signal.

\* \* \* \* \*